UNITED STATES PATENT OFFICE.

BERTRAM LEVIN, OF HALE, ENGLAND.

MANUFACTURE OF A BORON DERIVATIVE OF PYROPHOSPHORIC ACID.

1,336,974.　　Specification of Letters Patent.　Patented Apr. 13, 1920.

No Drawing.　　Application filed May 15, 1918. Serial No. 234,674.

*To all whom it may concern:*

Be it known that I, BERTRAM LEVIN, a subject of the King of Great Britain and Ireland, and a resident of Hale, in the county of Chester, England, have invented certain new and useful Improvements in the Manufacture of a Boron Derivative of Pyrophosphoric Acid, of which the following is a specification.

The application in the arts of solid pyrophosphoric acid and of the acid pyro-phosphates has been hitherto limited owing to the fact that these substances, as normally prepared, are extremely hygroscopic, and as a result of moisture absorption, acquire a condition in which the pyro-compounds revert to the ortho-phosphate.

I have found that by combining suitable boron compounds, such as, for example, boric anhydrid, boric acid, meta and/or pyro-boric acid, with pyro-phosphoric acid in molecular proportions of boric acid and pyro-phosphoric acid, that a stable boron derivative of pyro-phosphoric acid, having the formula $BHP_2O_7$ is formed, which derivative or compound does not become deliquescent upon exposure to air, nor yet revert to an ortho compound under normal storage conditions.

The following is an example of how the stable derivate or compound may be produced:

Having obtained a weighed quantity of pyro-phosphoric acid, I proceed to fuse the same and continue to heat until a temperature of 250° C. is indicated, at which stage I add the calculated weight of boric acid, or boric anhydrid, necessary to represent molecular proportions of each substance. The whole mass is worked up to a homogeneous paste, the heating being continued and, if necessary, the temperature increased to promote this result. Alternatively, I may commence with ortho-phosphoric acid which during the heating operation is converted into pyro-phosphoric acid, it being, of course, necessary in such case to insure that the proportions used are such as to provide two molecules of phosphoric acid for one molecule of boric acid. While the mass, by which ever means it is produced, is in a mobile form, it is run into trays which are placed in a heated chamber, kiln or oven. The mass, if skilfully prepared, dries into cakes of a friable and a non-hygroscopic nature. It may be conveniently ground into a powder. Or by making a solution of it and adding ammonia, alkalis, alkaline or metallic bases, salts may be prepared, some of which, such as the ammonia salt, may be crystallized out.

The new non-hygroscopic and stable boron derivative of pyro-phosphoric acid is applicable for many uses in the arts and especially for incorporation with pyro-phosphoric acid and acid pyro-phosphates to render same non-hygroscopic and stable.

What I claim as my invention, and desire to secure by Letters Patent is:—

1. The process of manufacturing a non-hygroscopic and stable boron derivative of pyro-phosphoric acid, which consists in heating a weighed quantity of pyro-phosphoric acid, until a temperature of 250° C. is indicated, adding a boron compound in such an amount with reference to the pyro-phosphoric acid as their molecular proportions bear to each other, working to a paste under continued heating, running into trays while in a mobile form, and drying the same.

2. The process of manufacturing a non-hygroscopic and stable boron derivative of pyro-phosphoric acid, which consists in mixing a boron compound and pyro-phosphoric acid in amounts corresponding to their molecular proportions, heating the mixture, working to a paste and drying the same.

3. The process of manufacturing a non-hygroscopic and stable boron derivative of a phosphoric acid, which consists in heating together a boron compound and a phosphoric acid in amounts corresponding to their molecular proportions.

4. The process of manufacturing a non-hygroscopic and stable boron derivative of a phosphoric acid, which consists in heating together boric acid and ortho-phosphoric acid in proportions of two molecules of the phosphoric acid to one molecule of boric acid.

5. A non-hygroscopic and stable boron derivative of pyro-phosphoric acid, manufactured by combining a boron compound with pyro-phosphoric acid in molecular proportions of the boron compound and pyro-phosphoric acid.

6. A non-hygroscopic compound comprising a pyro-phosphate of boron.

In witness whereof I have hereunto set my hand.

BERTRAM LEVIN.